United States Patent
Chriss et al.

(10) Patent No.: US 12,483,536 B2
(45) Date of Patent: Nov. 25, 2025

(54) FRICTION FREE DOWNLOAD OVER A WEB PROXY

(71) Applicant: T-Mobile Innovations LLC, Overland Park, KS (US)

(72) Inventors: Erica Dawn Chriss, Seattle, WA (US); Bill G. Mccracken, Jr., Lenexa, KS (US)

(73) Assignee: T-Mobile Innovations LLC

( * ) Notice: Subject to any disclaimer, the term of this patent is extended or adjusted under 35 U.S.C. 154(b) by 16 days.

(21) Appl. No.: 18/434,535

(22) Filed: Feb. 6, 2024

(65) Prior Publication Data
US 2025/0254148 A1    Aug. 7, 2025

(51) Int. Cl.
*H04L 9/40* (2022.01)

(52) U.S. Cl.
CPC ...... *H04L 63/0281* (2013.01); *H04L 63/0876* (2013.01); *H04L 63/102* (2013.01)

(58) Field of Classification Search
CPC  H04L 63/0281; H04L 63/0876; H04L 63/102
See application file for complete search history.

(56) References Cited

U.S. PATENT DOCUMENTS

| | | | |
|---|---|---|---|
| 8,601,468 B1 * | 12/2013 | Boodman | H04L 63/1483 717/176 |
| 11,824,840 B1 * | 11/2023 | Meixler | H04L 9/3247 |
| 2015/0347173 A1 * | 12/2015 | Shen | G06F 9/5077 718/1 |
| 2020/0073905 A1 * | 3/2020 | Deng | G06F 16/9574 |

* cited by examiner

*Primary Examiner* — Gil H. Lee

(57) ABSTRACT

A system comprises a user communication device, a content management server, and a friction free download (FFD) proxy server. The user communication device is configured to send identification information of the user communication device; receive web content in a first web application; send an FFD installation request to the FFD proxy server; download the second web application; and install the second web application during an active session of the first web application. The content management server is configured to send the web content. The FFD proxy server is configured to register the content management server and the user communication device; receive the FFD installation request; authenticate the user communication device during the application session of the first web application; send the second proxy routing information; and send notification information indicating a status of the FFD installation of the second web application.

18 Claims, 8 Drawing Sheets

FRICTION FREE DOWNLOAD OVER A WEB PROXY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication devices such as, for example, consumer devices and Machine-to-Machine (M2M) communication devices are widely deployed in a wireless network, such as a cellular network. These communication devices may include a smart phone, a tablet computer, a wearable computer, a game console, electronic fabrics or wearable clothing, or portable and desktop computers, while M2M devices may include a thermostat, a refrigerator, a water meter, or other everyday Internet of Things (IoT) devices. These communication devices may access any number of cellular and Internet Protocol (IP) networks for receiving text data, voice data, video data, support services, and other similar services. Cellular networks may exchange wireless signals with mobile communication devices using wireless network protocols. Exemplary wireless network protocols include Institute of Electrical and Electronic Engineers (IEEE) 802.11 (WIFI), Long Term Evolution (LTE), Fifth generation (5G) new radio (5GNR), and Low-Power Wide Area Network (LP-WAN).

Many aspects of a user's activities are tied to using communication devices for accessing services that are provided via the Internet or a wireless network. Some of these aspects may include interacting with other entities, both socially and economically, for conducting financial transactions, gaming, communicating with other communication devices over social media platforms, browsing, and/or accessing media using applications and other software on the communication device.

SUMMARY

In an embodiment, a system comprising a user communication device, a content management server, and a friction free download (FFD) proxy server is disclosed. The user communication device is configured to send, via an FFD client application, identification information of the user communication device; send, via the FFD client application, subscriber information of the user at the mobile network operator (MNO)/mobile network provider; receive, via a first web application, web content in an application session of the first web application; send, via the first web application, an FFD installation request for implementing an FFD installation of a second web application on the user communication device in the application session; download, using second proxy routing information, an application package container of the second web application; and install, via the FFD client application, the second web application during the application session of the first web application.

The FFD proxy server is configured to receive, from the FFD client application, identification information of the user communication device; receive, from the content management server, web service registration information of the content management server, wherein the web service registration information comprises first proxy routing information, wherein the first proxy routing information comprises information for routing the FFD installation request to the FFD proxy server; register the content management server at the FFD proxy server using the web service registration information; receive, from the first web application, the FFD installation request for implementing the FFD installation of the second web application on the user communication device; authenticate the user communication device in response to receiving the FFD installation request during the application session of the first web application; send, to the FFD client application and during the application session of the first web application, the second proxy routing information for the second web application in response to authenticating the user communication device; and send, to the first web application during the application session of the first web application, notification information indicating a status of the FFD installation of the second web application.

In another embodiment, a method is disclosed. The method comprises receiving, by an FFD proxy server via a FFD client application of a user communication device, identification information of the user communication device; receiving, by the FFD proxy server from a content management server, web service registration information, wherein the web service registration information comprises first proxy routing information; receiving, by the FFD proxy server in an application session of a first web application of the user communication device, an FFD installation request for implementing the FFD installation of a second web application on the user communication device, wherein the FFD installation request is based on web content in the first web application, wherein the web content the first proxy routing information that redirects the FFD installation request to the FFD proxy server; authenticating, by the FFD proxy server, the user communication device in response to receiving the FFD installation request and during the application session of the first web application; sending, by the FFD proxy server to the FFD client application and during the application session of the first web application, second proxy routing information for the second web application instructing the FFD client application to download an application package container and install the second web application to the user communication device during the application session of the first web application in response to authenticating the user communication device; sending, by the FFD proxy server to the first web application and during the application session of the first web application, notification information indicating a status of the FFD installation of the second web application on the user communication device after installation of the second web application during the application session of the first web application.

In yet another embodiment, a system comprising a user communication device, a content management server, and a friction free download (FFD) proxy server is disclosed. The user communication device is configured to send, via an FFD client application, identification information of the user communication device, wherein the identification information comprises at least one of an alphanumeric identifier of the user communication device or identity information of a user of the user communication device; receive, via a first web application, web content in an application session of the first web application; and send, via the first web application, an FFD installation request for implementing an FFD installation of a second web application on the user communication device in the application session; download, using second proxy routing information, an application package container of the second web application; and install, via the FFD client application, the second web application during the application session of the first web application. The FFD proxy server is configured to receive, from the content management server, web service registration information of the content management server during the application session of the first web application, wherein the web service registration information comprises first proxy routing information, wherein the first proxy routing information comprises information for routing the FFD installation request to the FFD proxy server; register, using the web service registration information, the content management server for the FFD installation; receive, from the first web application, the FFD installation request for implementing the FFD installation of the second web application on the user communication device; route, using the proxy routing information, the FFD installation request to the FFD proxy server, authenticate the user communication device in response to receiving the FFD installation request during the application session of the first web application, wherein authenticating the user communication device comprises receiving, from the FFD client application, second identification information of the user communication device in the FFD installation request; comparing the identification information with the second identification information to obtain a comparison result; and determining whether the user communication device is authenticated based on the comparison result; send, to the FFD client application and during the application session of the first web application, the second proxy routing information for the second web application in response to authenticating the user communication device; and send, to the first web application during the application session of the first web application, notification information indicating a status of the FFD installation of the second web application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
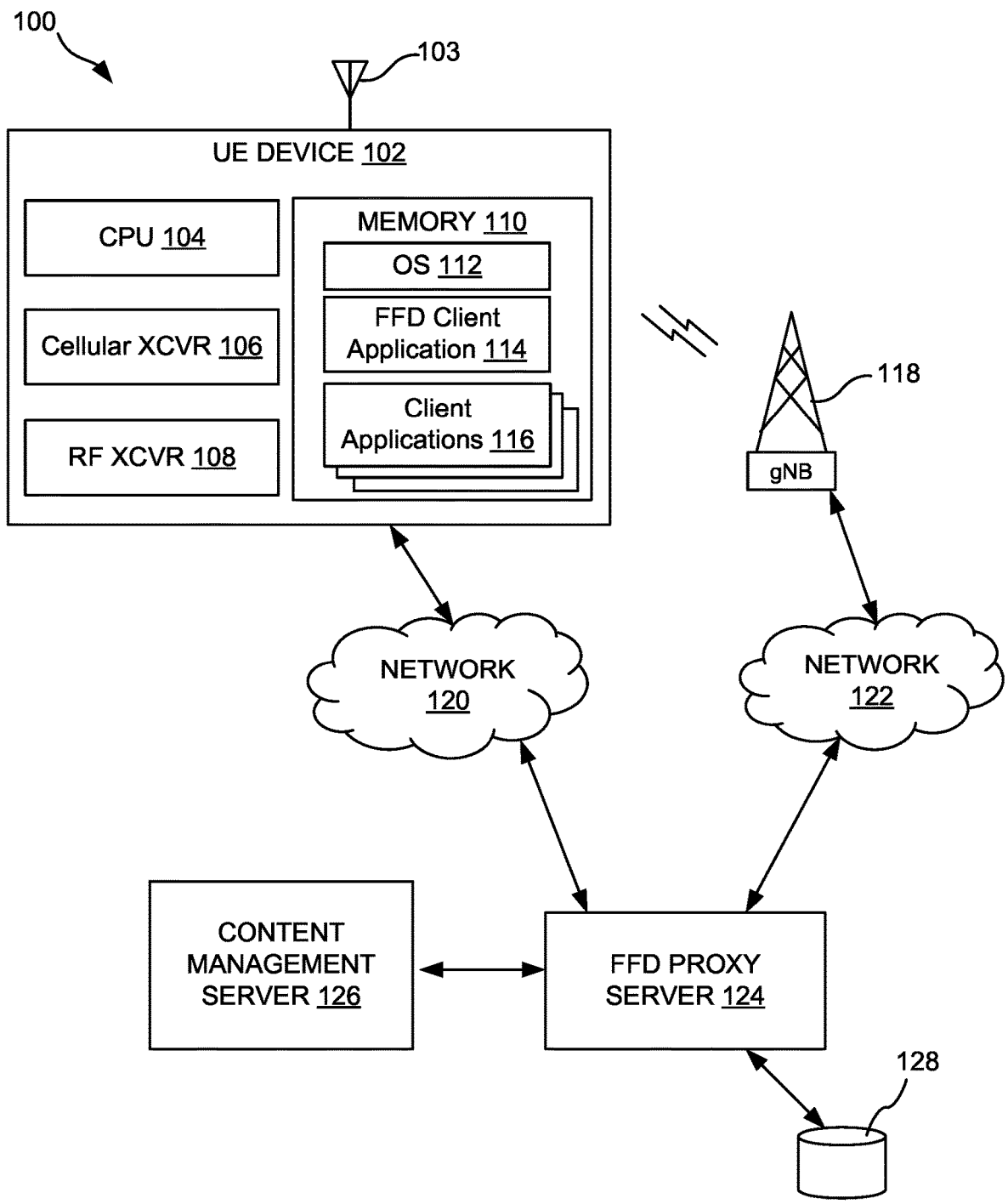
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Communication devices such as, for example, consumer devices are widely deployed in wireline and cellular networks. These communication devices may include a smart phone, a tablet computer, a portable or a desktop computer, electronic fabrics or wearable clothing, or a gaming console that may be used to communicate information over the Internet. These communication devices may access any number of cellular and Internet Protocol (IP) networks for receiving text data, voice data, video data, support services, and other similar services. Cellular networks may exchange wireless signals with mobile communication devices using cellular network protocols. Exemplary cellular network protocols include Institute of Electrical and Electronic Engineers (IEEE) 802.11 (WIFI), Long Term Evolution (LTE), Fifth generation (5G) new radio (5GNR), and Low-Power Wide Area Network (LP-WAN).

Many aspects of a user's activities are tied to using communication devices for accessing services that are provided via the Internet or a wireless network. Some of these aspects may include using web apps/software on the communication device to conduct financial transactions, play games, communicate with other users over social media platforms, browse the Internet, and/or stream music and/or videos from web media platforms. As used herein, a web app may be application software that accesses services of the Internet using a web browser or a similar application on a communication device. Currently, there are several conventional scenarios for installing applications/software to a user's communication device after provisioning the communication device to a subscriber of the MNO. In one scenario, in response to a request to a web server for installing an application, a web server initially downloads an agent software to the communication device (for example, downloads a hard link to the communication device). Once the agent software is installed, the web server sends the agent software an install request, and the user engages in a dialog via a user interface of the agent software to install the application from the web server. Another conventional scenario may include the user downloading the application from a content web store (for example, GOOGLE Play or the APPLE App Store). For instance, the web server may transmit and install request for an application such as, for example, a web content to the communication device that is associated with an application in a content web store or a web server of a third-party vendor. A user may click on the content (hereinafter referred to as "user click") to trigger a request to the content web store or the web server of the third-party vendor to install a new web app to the communication device.

Currently, application installation over the Internet using web content is not efficient when a user is in an on-going activity in a web app (for instance, within a web browser or a web-based gaming application) of the communication device while accessing the Web. In an example, web content may be any creative element that is accessible over the Internet and may include, in an example, notification messages in pop-up web pages/pop-up windows of a web browser or a gaming application (for example, for a product, for a service, for an application/software), or any other creative element, such as text, images, archived e-mail messages, data, e-services, audio and video files. For instance, a user may receive a web content for an application download as a web page within the web app as an information pop-up or embedded as a feature in the application while the user is engaging in an on-going activity in the web app. In an example, while the user is playing a game, a web content to purchase another game may be displayed in the game being played and which the user may be interested in downloading. In an example, a user may click on the web content such as, for example, hover a cursor over the web content before selecting the web content (also referred to as "user click"). In an example in response to the user click, the user is presented with a dialog web page to elicit authorization responses for installing the new game while the on-going application is paused. Further, a user click on the web content initiates installation of the new application in a new web page while pausing the user's on-going activity in the first game, which interferes with the user's on-going activity playing the first game and may reset the user's position in the game. Further, the user click initiates a web page dialog that may require the user to interact with a web platform via multiple web pages during installation of the new web app, which further delays the user from quickly going back to resuming the user's on-going activity playing the first game. Further, prolonged user engagement in dialog web pages is intrusive to the user in the on-going activity while the new application is being installed. As used herein, the process of interrupting an on-going activity to initiate a web app download is referred to as a "friction download". Further, the user may have to authenticate the communication device prior to downloading the web app, but the web store or web server may not be able to verify the authenticity of the user that is initiating the download of the web app.

As disclosed herein, a user equipment (UE)/communication device is in communication with an FFD proxy server and a content management server to perform a friction-free download (FFD) installation of a web app (hereinafter referred to as a "web app") on the UE without interrupting an on-going user activity on the UE. As used herein, an FFD is a process of installing a web app on the UE after a user selects web content in the web app without interrupting the user from performing an on-going user activity on a web app of the UE while the new web app is installed. In an example, the content for downloading a web app may be transmitted to the user via a web browser (for example, as a web content in the web page) or to the user via a mobile device, computer, or console video game (for example, as an in-game content in the video game). In an example, the web app receives content on the UE while the user is participating in an on-going activity on the web app.

In an example, the FFD proxy server registers an FFD client application on the UE for FFD installation. In an example, the FFD client application on the UE may send user registration information and UE identity information of the UE to the FFD proxy server via an application programming interface (API) of the FFD proxy server. In examples, the FFD client application may be pre-installed by an MNO of a user of the UE prior to provisioning the UE to the user or may be downloaded from the FFD proxy server and installed on the UE when the UE is powered on by the user. In an example, the FFD proxy server may be a proxy server that is associated with an MNO of the user of the UE.

In an example, the FFD proxy server registers a content management server. In an example, the content management server sends web service registration information to the FFD proxy server and may include proxy routing information associated with routing requests to access an application package container as part of the FFD installation to the FFD proxy server. In an example, the content management server may generate and provide a web content to the web app while the user is in an active session (for example, an on-going application session) in the web app and interacting with or accessing content from the content management server. In an example, the web content may be configured with information for implementing an FFD installation of a new web app on the UE. In an example, the web content may be received from the FFD proxy server or sent from a content management service of the content management server via the FFD proxy server. In an example, the web content may be embedded in an application installation request (for example, a web request) that is displayed at a specific location on the web app. In an example, a user may perform a user click to request installation of the new web app associated with the web content from the content management server. In an example, the web content may include routing information that is configured to route user responses from the user based on a user click on the web content to the FFD proxy server. In an example, the user click provides a response back to the FFD proxy server for the application installation request. In an example, the FFD proxy server may "stage" (for example, pre-store) the new web app at storage of the FFD proxy server based on the web content that is delivered to the user while the user is engaged in the on-going activity on the web app.

In an example, the FFD client application may transmit an FFD installation request to the FFD proxy server as an on-device request based on a user click that authorizes FFD installation of the new web app. In an example, the authorization message may be sent to the FFD proxy server according to an URL location that is embedded in the web page information link. In an example, user authorization causes an authorization message to be sent to the FFD proxy server without the user having to interrupt an on-going activity being performed by the user on the web app, which provides benefits/advantages over web app installations in conventional solutions where a user may be redirected to a web portal (for example, an application store) or a location on the Internet when the user click is performed in order to interact with an installation dialog for completing the web app installation while pausing the on-going activity. In an example, the benefit includes an efficient process for installing another web app on the UE without distracting the user in engaging in the on-going activity in a web app on the UE.

In an example, the FFD proxy server authenticates the UE. In an example, the communication device sends an authenticating request to the FFD proxy server after the FFD pre-check of the UE is verified (for example, has passed). In an example, the authentication request may include one or more elements including one or more of the subscriber information of the user and the user registration information for authenticating the user to the cellular network without engaging the user, which provides benefits over conventional methods where a user dialog engages the user to complete the authentication and installation of the web app.

In an example, the FFD proxy server may send a proxy request containing the location of the application package container for the new web app to the FFD client application based on a successful FFD pre-check by the FFD proxy server. In an example, the proxy request may include routing information for downloading the application package container from the database associated with the FFD proxy server or from databases associated with the content management server. In an example, the FFD client application uses an API to receive the proxy request from the FFD proxy server and uses the routing information to download the application package container using an over-the-air download. In an example, the FFD client application performs the FFD installation of the new web app as a silent installation on the UE (for example as an FFD installation). In an example, the FFD proxy server may send a notification message as a pop-up notification message in an active session of the web app so as to not interfere with the active application session on the web app. In an example, the notification message may notify the user that the new web app is installed on the UE. In another example, the pop-up notification message may be displayed on a graphical icon in the active application session of the UE while the active application session of the web app is on-going.

Turning now to FIG. 1, a communication system 100 is described according to an embodiment. In an embodiment, the communication system 100 is configured to perform an FFD installation of a new web app on a communication device/user equipment (UE) over an FFD proxy server. In an example, the new web app is installed as an FFD installation without interrupting the user from an on-going user activity on the web app of the communication device. In an example, the FFD installation is a "silent installation" where a user may continue with the on-going activity on the web app while the new application is installed on the communication device as a background process of the communication device. In an embodiment, the communication system 100 may comprise user device/user equipment (UE) 102, cell site 118, first communication network 120, second communication network 122, content management server 126, FFD proxy server 124, and storage database 128. In an example, UE 102 may be a communication device where a user may transmit a request for performing an FFD installation for installing a web app on the communication device based on content that may be presented to the user via a web app such as, for example, a communication device like a game console, a smart phone, a tablet computer, electronic fabric or wearable clothing, or portable and desktop computers. UE 102 may be a fixed communication device or a mobile communication device. In an embodiment, the UE 102 comprises antenna 103, central processing unit (CPU) 104, cellular transceiver 106, RF transceiver 108, memory 110 that stores operating system (OS) 112, FFD client application 114 and one or more client applications 116.

In an embodiment, the antenna 103 may be communicatively coupled to the cellular transceiver 106, RF transceiver 108, FFD client application 114, and client applications 116 through a wired connection. The antenna 103 may include radio frequency (RF) reception and transmission components of the UE 102, and may be part of the cellular transceiver 106. In an example, cellular radio transceiver 108 may establish a radio communication link to a cellular network using antenna 103. In an embodiment, cellular transceiver 106 includes a 5G RAT that provides an air interface for UE 102. While not shown in FIG. 1, cellular transceiver 106 may include additional circuit components to process and manipulate the wireless signals at UE 102.

In an embodiment, memory 110 comprises a non-transitory portion that embeds one or more applications for execution by CPU 104. In embodiments, memory 110 embeds an operating system (OS) 112, FFD client application 114, and client applications 116. In an embodiment, OS 112 comprises executable instructions of an OS kernel of UE 102. In an embodiment, OS 112 may be executed to perform operations such as, for example, operations to manage input/output data requests to UE 102 (e.g., from software and/or FFD client application 114 and client applications 116), translate the requests into instructions (e.g., data processing instructions) for execution by CPU 104 or other components of UE 102, manage the UE 102 resources, such as CPU 104 and memory 110 when executing and providing services to applications on UE 102 such as FFD client application 114 and client applications 116.

In an embodiment, UE 102 may include FFD client application 114 and one or more client applications 116. In an embodiment, FFD client application 114 may be configured as an on-device Android container application or an on-device APPLE package store file that sends and receives instructions for loading third-party application containers. In an example, FFD client application 114 may send and receive instructions for loading third-party application containers (for example, an Android Package Kit (APK) file for the Android OS or OS package App Store (IPA) file for the APPLE OS) into memory 110 for execution by OS 112 in a normal execution environment of memory 110. In an embodiment, client applications 116 may be configured to send and receive messages including text, audio, video, and other similar communications from UE 102 to other communication device via first communication network 120 such as the Internet or second communication network 122 such as a cellular network. In examples, client applications 116 may include software applications to perform specific user-related communication tasks such as, for example, a web browser to communicate instructions and data to servers over first and second communication networks 120, 122, a GUI to create data requests and translate the requests into instructions, or may perform user-related telecommunication tasks such as, for example, electronic mail (email) applications like OUTLOOK and GMAIL, web conference applications like ZOOM and WEBEX, and social networking applications such as LINKEDIN, FACEBOOK, or other similar applications. In an example, client applications 116 (for example, a web browser) may receive notifications from FFD proxy server 124 of a mobile carrier (e.g., an MNO) based on the user's request on the client applications 116 to perform an FFD installation while connected to the Internet. In an example, the notifications may include a text message, a voice message, or a web page in a specific client application 116 based on the user requesting the FFD installation via the specific client application 116.

The UE 102 may be communicatively coupled to first communication network 120 and to second communication network 122. In an example, UE 102 may be wirelessly coupled to cell site 118 for connecting UE 102 to second communication network 122 and/or may be coupled via a wired connection to communication network 120. In an embodiment, RF transceiver 108 may establish a radio communication link to first communication network 116 via a wireless gateway (not shown) using antenna 103. In an example, first communication network 120 comprises the Internet. In an example, the communication link may be established according to a wireless network protocol that includes the IEEE 802.11 (WIFI) protocol. In an embodiment, RF transceiver 108 includes RF circuits that provide an air interface for UE 102. While not shown in FIG. 1, RF transceiver 108 may include additional circuit components to process and manipulate wireless signals that are received from first communication network 120. In an example, communication network 122 may be a core network (for example, a macro network) of a MNO/mobile network provider, and communication network 120 may be a data network such as the Internet. In an embodiment, UE 102 may request 5G services of communication network 122 using the radio communication link. In examples, the communication link between communication network 122 and UE 102 may be established according to an LTE protocol, a CDMA protocol, a GSM protocol, or a 5G telecommunication protocol. The communication network 118 may provide 5G services including voice, data, and messaging services to the UE 102 using virtual network functions. Communication networks 120, 122 may be communicatively coupled to FFD proxy server 124 and content management server 126. The system 100 may comprise additional communication networks similar to communication networks 120, 122 and any number of cell sites 118.

In an example, FFD proxy server 124 may be configured to be a proxy between the communication device and a content management server 126. In an example, FFD proxy server 124 may register the communication device for FFD installations of one or more web apps using UE identity information of UE 102 and user registration information. In an example, FFD proxy server 124 may register content management server 126 for providing FFD installations of a web app on UE 102 based on web notification messages (for example, as information pop-up web pages) that are received from content management server 126. In an example, FFD proxy server 124 may be a proxy server that is associated with an MNO of a user of UE 102. In an example, FFD proxy server 124 may use the user registration information to authenticate the user of the communication device to the cellular network of the MNO in order to implement registration, security, connection, and authentication and authorization of FFD installation on the communication device by the FFD proxy server 124. In an example, FFD proxy server 124 may store registration information from UE 102 and content management server 126 in database 128.

In an example, content management server 126 is configured to provide a content management service to UE 102. In an example, content management server 126 may register with FFD proxy server 124 to install APK container files on UE 102 based on contents that are transmitted to UE 102 from content management server 126 or via FFD proxy server 124. In an example, content management server 126 may transmit proxy routing information associated with routing requests from UE 102 to FFD proxy server 124 for installing applications and/or content on UE 102 from content management server 126 or that is staged/pre-stored at FFD proxy server 124 and that is received from content management server 126. In an example, content management server 126 may be a dedicated server for providing APK files associated with one or more applications such as, for example, one or more video gaming application for implementing FFD installation on UE 102.

Figure 2:
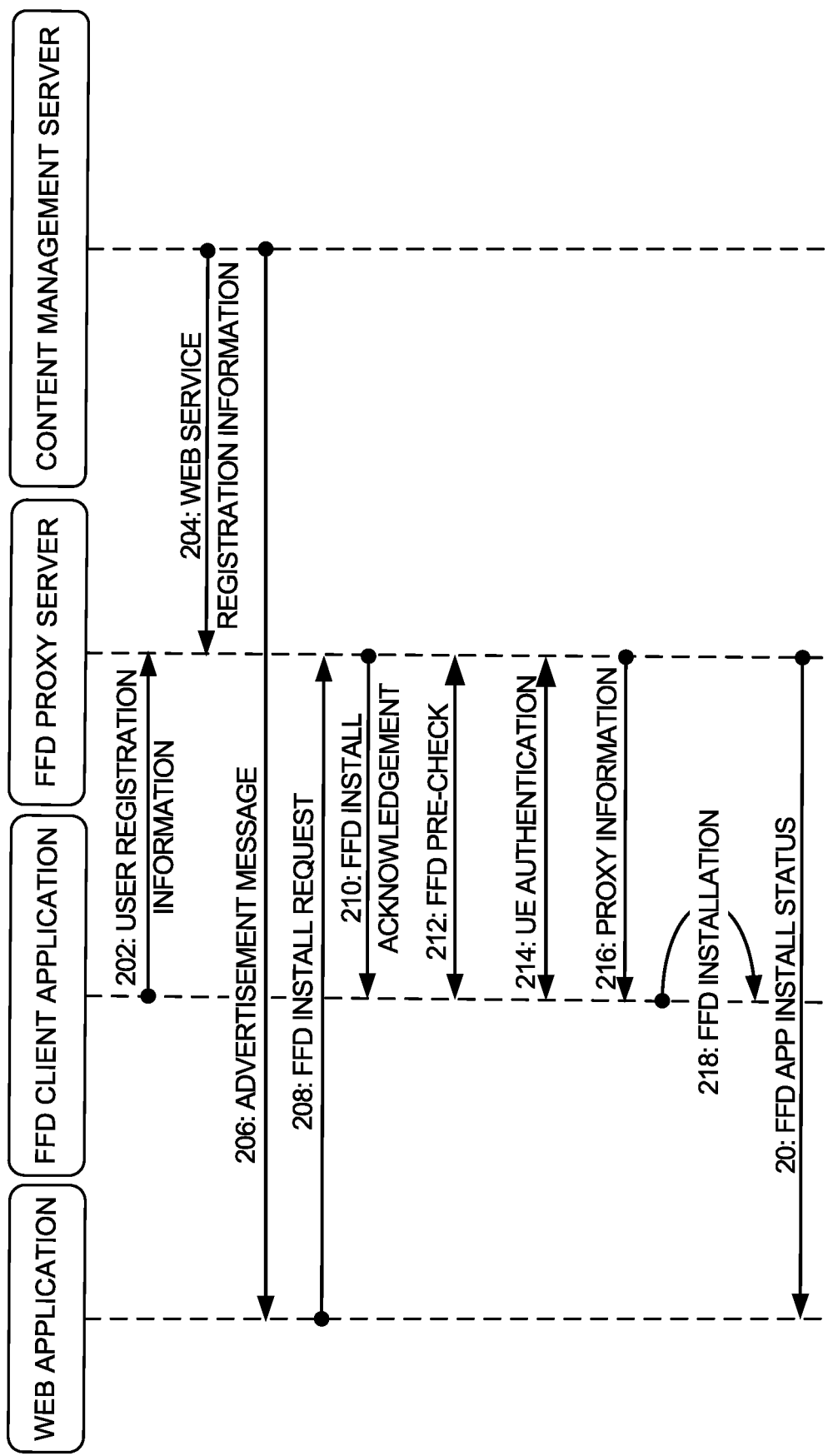
FIG. 2 is a data flow diagram of a method according to an embodiment of the disclosure.

Turning now to FIG. 2, and with continued reference to FIG. 1, a data flow diagram 200 is described. In an embodiment, the data flow diagram 200 describes a method for implementing a friction free download (FFD) installation of a web app on a communication device using an FFD proxy server. In an example, the communication device may be a consumer device such as, for example, the UE 102 in FIG. 1. In an example, the FFD proxy server provides an efficient process for installation of another web app on the communication device and while the user is engaged in an on-going activity in a web app on the communication device. In an example, the FFD installation reduces responses that are entered by a user of the communication device in dialog web pages during installation of the other web app and limits the interruptions to the user engaging in the on-going activity within a web app on the communication device while the new web app is installed on the communication device.

At step 202, the method comprises registering the communication device with an FFD proxy server. In an example, the FFD proxy server is FFD proxy server 124 in FIG. 1. In an example, the FFD proxy server may be a proxy server that is associated with an MNO of the user of the communication device. In an example, an FFD client application on the communication device may be, for example, FFD client application 114 (FIG. 1). In an example, the FFD client application uses an application programming interface (API) to send user registration information and communication device identification information to the FFD proxy server via an application programming interface (API) of the FFD proxy server. In an example, the FFD client application may automatically send, without user initiation, the user registration information to the FFD proxy server when the communication device is powered on by the user. In an example, the FFD proxy server may request the FFD client application to send the user registration information after the user communication device is powered on by the user and connected to the cellular network. In an example, the communication device identification information may be a mobile advertising identifier (MAID), a GOOGLE Advertising ID (GAID), or an APPLE unique device identifier (UDID), which is a unique alphanumeric identifier that is assigned by the operating system of the communication device. In another example, the communication device identification information may be an MNO generated identity information that is associated with a wireless subscriber of and may be assigned by the web proxy server. In an example, the MNO generated identity may include subscriber information such as, for example, a Mobile Station Integrated Services Digital Network (MSISDN) number associated with a user of a communication device, a user name, a user address, and/or International Mobile Equipment Identity (IMEI) number. In an example, the user registration information may include subscriber information of the user for authenticating the user of the communication device to the cellular network of the MNO in order to implement registration, security, connection, and authentication and authorization of FFD installation on the communication device by the FFD proxy server. In an example, the FFD proxy server stores the identification information and user registration information to a local storage associated with the FFD proxy server. In examples, the FFD client application may be pre-installed by an MNO of a user of the communication device prior to provisioning the communication device to the user or may be downloaded from the proxy server and installed on the communication device when the communication device is powered on by the user.

At step 204, the method 200 comprises registering a content management server with the FFD proxy server for FFD installation. In an example, the content management server such as, for example, content management server 126 sends web service registration information to the FFD proxy server and that is used to register the content management server for FFD installation. In an example, the content management server may use a software development kit (SDK) of the MNO to send the web service registration information of the content management server for registering content management service that is provided by the content management server. In an example, web service registration information may include web pages from the content management server that are coded with proxy routing information for routing requests for FFD installation of web applications that are authorized by the communication device to the FFD proxy server.

At step 206, the method 200 comprises receiving a web content at a web app on the communication device. In an example, the web content may include a web notification message (for example, information pop-up web page) of a new application that is presented in the web app as a graphical icon (for example a static image or an animated image) for selection by a user. In an example, upon a user click of the web content, an authorization message is sent to the FFD proxy server authorizing FFD installation of a web app associated with the information pop-up web page. In an example, a web app of the communication device receives the web content that may be displayed while the user is using or interacting with the web app. In an example, the web application may be a web browser application, a gaming application, or another application that is configured to send and receive data over the Internet via the web app. In an example, the content management server may generate and provide a web content to the web app while the user is using the web app and interacting with content in the content management server.

In an example, the web content may be a blended in-game video notification message, a blended web content, or a banner content. In an example, the web content may display the notification message that provides information on the new web app via a blended web content or a blended in-game web content that is intended to be non-intrusive within the web page to attract the attention of the user while the user performs an on-going activity in the web app. In an example, the new web app may be related to the web app that is being performed by the user on the communication device. In an example, the web content may embed an application installation request (for example, a web request) and that is displayed at a specific location on the web app. In an example, a user may perform a user click to request installation of the new web app that is associated with the web content from the content management server. In an example, the user click provides a response back to the FFD proxy server for the application installation request based on the proxy routing information in the web page. In an example, the user click may display a "YES" graphical icon that requires user selection for authorizing installation of the new web app or a "NO" graphical icon that requires user selection to deny installation of the new web app. In an example, the user may ignore the web contents whereby the FFD installation is not implemented.

In an example, the graphical icons may include proxy routing information for routing the application installation request to the FFD proxy server when a "YES" graphical icon is clicked. In an example, the FFD proxy server may "stage" (for example, pre-store) the new web app at storage of the FFD proxy server based on the web content that is delivered to the user while engaged in the on-going activity on the web app. For instance, the FFD proxy server may pre-store/download to a database of the FFD proxy server an application package container (for example, an APK file) for the new web app from the content management server prior to sending the web content associated with the new web app to the communication device. In an example, the FFD proxy server may request the content management server to notify the FFD proxy server prior to sending the web content associated with the new web app to the communication device in an on-going application session of the web app. In an example, the web content may include proxy routing information that is configured to route user responses from the user based on a user click on the web content to the FFD proxy server. In an example, the web content may be received from content management server. In an example, the content management server may transmit the web content to the web app as a notification message/information pop-up having a referral universal resource locator (URL) link of the FFD proxy server.

At step 208, the method comprises transmitting an FFD installation request to the FFD proxy server as an on-device request. In an example, a user, based on a user click of the "YES" graphical icon of the web content, may cause an authorization message/approval message to be sent to the FFD proxy server requesting installation of the new web app on the communication device. In an example, the installation request may include UE identification information (for example, MAID, GID, or UDID) and subscriber information of the user of the MNO. In an example, the user click may be performed while the user is interacting with (for example, using) the web app. In an example, the FFD proxy server may intercept the FFD installation request based on a routing proxy. In an example, the authorization message may be sent to the FFD proxy server according to the routing proxy that includes a URL location that is embedded in the web page information pop-up. In an example, routing the authorization message to the FFD proxy server without the user having to interrupt an on-going activity being performed by the user on the web app overcomes the problems associated with web app installations in conventional solutions. For instance, in conventional solutions, a user may be redirected to a web portal (for example, an application store) or a location on the Internet when the user click is performed in order to interact with an installation dialog for completing the web app installation while pausing the on-going activity. In an example, the benefit includes an efficient process for installing another web app on the UE without distracting the user in engaging in the on-going activity in a web app on the UE. In another example, a user selection of a "NO" graphical icon may cause the web content to be dismissed by the web app and removal of the web content from the web app.

At step 210, the method comprises sending a real-time FFD installation acknowledgment message to the FFD client application. In an example, the FFD proxy server may send the acknowledgement message confirming the FFD installation after authenticating the user of the communication device. In an example, the FFD proxy server may send an acknowledgment message in real-time to the FFD client application as a firebase cloud message (FCM). In an example, the FFD proxy server may authenticate the user of the communication device using the user identity information of the user of the communication device.

At step 212, the method comprises performing an FFD pre-check on the communication device. In an example, the FFD proxy server may transmit instructions to the FFD client application to identify the FFD client application that is to be installed as a new web app. In an example, the FFD proxy server may use the user identity information of the communication device (for example, the MAID, GAID or UDID) that is registered with the FFD proxy server to decode the acknowledgment message for identifying the new web app that is to be installed as an FFD installation.

In an example, the FFD proxy server may communicate with the FFD client application to verify whether the communication device includes storage space for installing the new web app or whether the new web app already exists on the communication device.

At step 214, the method comprises authenticating the communication device at the FFD proxy server. In an example, the FFD proxy server authenticates the communication device after the FFD pre-check of the communication device is completed (for example, the communication device is verified for FFD installation). In an example, FFD proxy server may authenticate the communication device by comparing the communication device identification information (for example, MAID, GAID, or UDID) that was sent in the FFD install request with the user registration information that was transmitted by the FFD client when the communication device was registered with the FFD proxy server for FFD installation to obtain a comparison result. In an example, the authenticating the communication device may include determining that the UE identification information matches the stored UE identification information and the subscriber information of the user is associated with the MNO that is stored at the FFD proxy server. In an example, the communication device is authenticated when the comparison result indicates the identification information is the same. In an example, the communication device is authenticated without engaging the user of the communication device.

At step 216, the method comprises transmitting proxy information to the FFD client application. In an example, the FFD proxy server may send proxy routing information to the FFD client application and that may include a location of an application package container for the new web app. In an example, the FFD proxy server may send the proxy information based on verifying the communication device has passed the FFD pre-check by the FFD proxy server. In an example, the proxy information may include proxy routing information for downloading the application package container from a database associated with the FFD proxy server. In another example, the proxy information may include proxy routing information for downloading the application package container from a database associated with the content management server. In an example, the FFD proxy server may pre-store the application package container for example, "staging") to a database associated with the FFD proxy server prior to sending the proxy routing information.

At step 218, the method comprises performing the FFD installation by the FFD client application. In an example, the FFD client application receives the proxy routing information from the FFD proxy server and uses the proxy routing information to download an application package container for the new web app using an over-the-air download from a location identified in the proxy routing information. In an example, the FFD client application performs the FFD installation of the new web app as a silent installation on the communication device (for example as an FFD installation) while the user continues with the on-going activity in the web application. In an example, the FFD client application sends an installation status message/communication to the FFD proxy server that is used to notify the communication device when FFD installation is completed on the communication device.

At step 220, the method comprises sending FFD installation status to the communication device upon completion of FFD installation. In an example, the FFD proxy server may send a notification message with installation status of the new web application during the application session of the web app. In an example, the notification message may be sent as a popup message on the user's screen of the communication device when the application session of the web app is active without interfering with the on-going user activity on the web app. In an example, the notification message may notify the user that the new web app is installed on the communication device. In another example, the notification message may be displayed on a graphical icon in the application session of the communication device while the application session of the web app is on-going.

Figure 3:
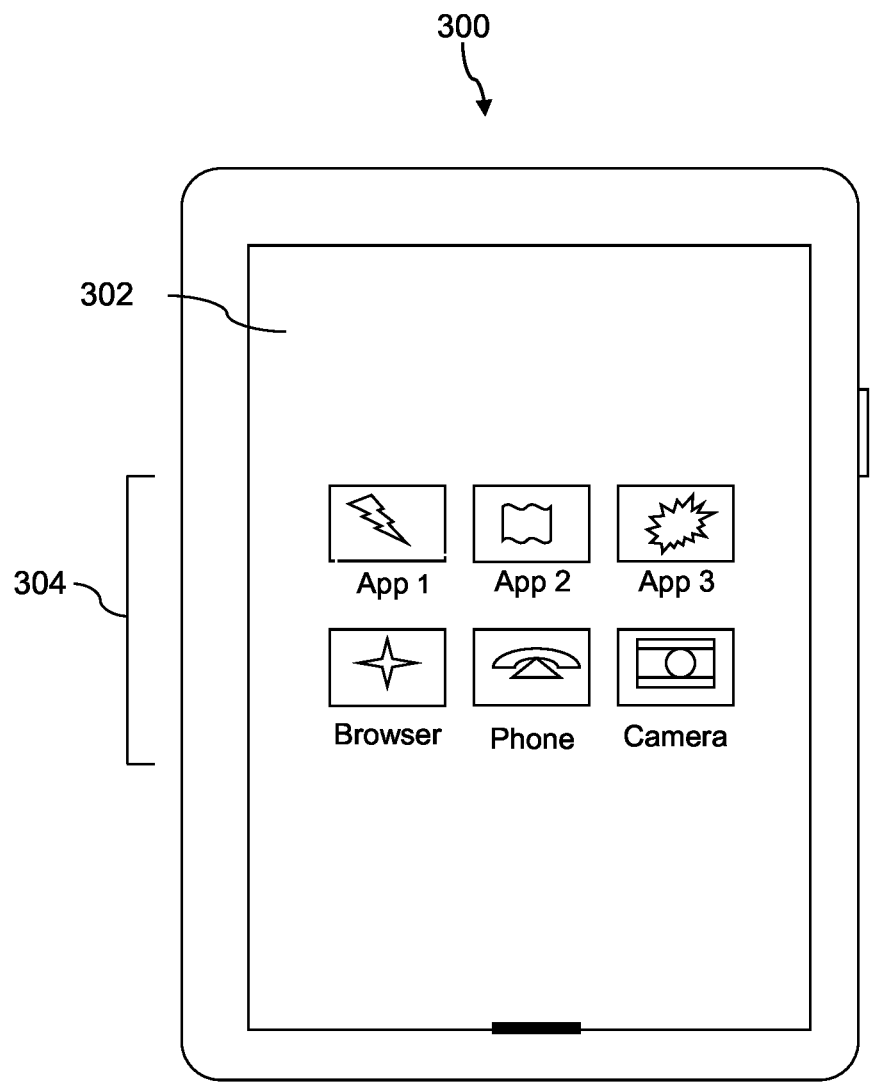
FIG. 3 is an illustration of a communication device according to an embodiment of the disclosure.

FIG. 3 depicts user equipment (UE) 300, which is operable for implementing aspects of the present disclosure, but the present disclosure should not be limited to these implementations. Though illustrated as a communication device, the UE 300 may take various forms including a game console, a smart phone, a tablet computer, or portable and desktop computers.

The UE 300 includes a touchscreen display 302 having a touch-sensitive surface for input by a user. A small number of application icons 304 are illustrated within the touch screen display 302. It is understood that in different embodiments, any number of application icons 304 may be presented in the touch screen display 302. In some embodiments of the UE 300, a user may be able to download and install additional applications on the UE 300, and an icon associated with such downloaded and installed applications may be added to the touch screen display 302 or to an alternative screen. The UE 300 may have other components such as electro-mechanical switches, speakers, camera lenses, microphones, input and/or output connectors, and other components as are well known in the art. The UE 300 may present options for the user to select, controls for the user to actuate, and/or cursors or other indicators for the user to direct. The UE 300 may further accept data entry from the user, including numbers to dial or various parameter values for configuring the operation of the handset. The UE 300 may further execute one or more software or firmware applications in response to user commands. These applications may configure the UE 300 to perform various customized functions in response to user interaction. Additionally, the UE 300 may be programmed and/or configured over-the-air, for example from a wireless base station, a wireless access point, or a peer UE 300. The UE 300 may execute a web browser application which enables the touch screen display 302 to show a web page. The web page may be obtained via wireless communications with a base transceiver station, a cellular network access node, a peer UE 300 or any other wireless communication network or system.

Figure 4:
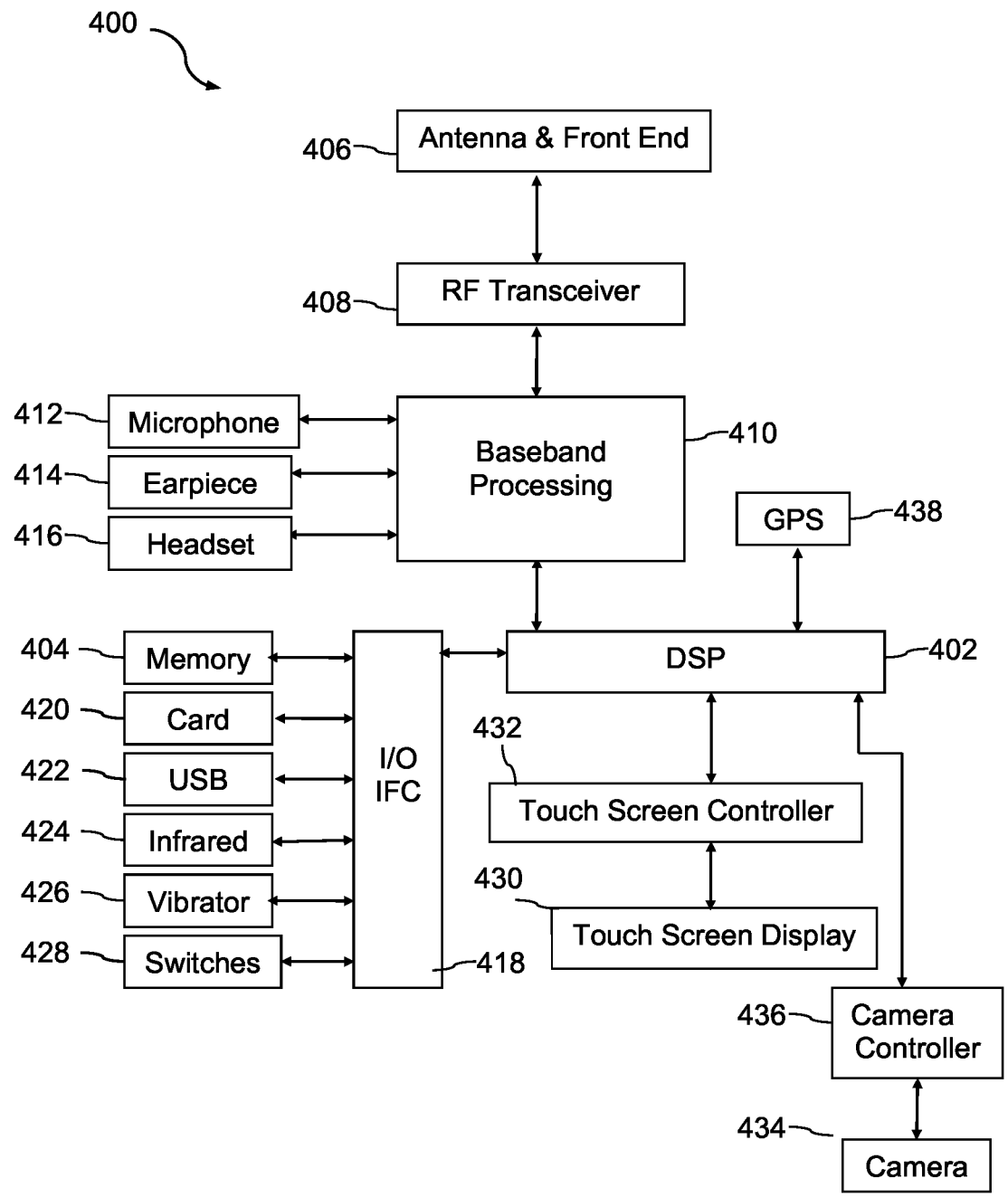
FIG. 4 is a block diagram of a hardware architecture of a communication device according to an embodiment of the disclosure.

FIG. 4 shows a block diagram of the UE 400. While a variety of known components of a communication device are depicted, in an embodiment a subset of the listed components and/or additional components not listed may be included in the UE 400. The UE 400 includes a digital signal processor (DSP) 402 and a memory 404. As shown, the UE 400 may further include one or more antenna and front end unit 406, a one or more radio frequency (RF) transceiver 408, a baseband processing unit 410, a microphone 412, an earpiece speaker 414, a headset port 416, an input/output (I/O) interface 418, a removable memory card 420, a universal serial bus (USB) port 422, an infrared port 424, a vibrator 426, one or more electro-mechanical switches 428, a touch screen display 430, a touch screen controller 432, a camera 434, a camera controller 436, and a global positioning system (GPS) receiver 438. In an embodiment, the UE 400 may include another kind of display that does not provide a touch sensitive screen. In an embodiment, the UE 400 may include both the touch screen display 430 and additional display component that does not provide a touch sensitive screen. In an embodiment, the DSP 402 may communicate directly with the memory 404 without passing through the input/output interface 418. Additionally, in an embodiment, the UE 400 may comprise other peripheral devices that provide other functionality.

The DSP 402 or some other form of controller or central processing unit operates to control the various components of the UE 400 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the UE 400 to function as a peripheral device to exchange information with a personal computer or other computer system. The infrared port 424 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, an LTE protocol, a CDMA protocol, a GSM protocol. In an embodiment, one of the radio transceivers 408 may comprise a near field communication (NFC) transceiver. The NFC transceiver may be used to complete payment transactions with point-of-sale terminals or other communications exchanges. In an embodiment, each of the different radio transceivers 408 may be coupled to its own separate antenna. In an embodiment, the UE 400 may comprise a radio frequency identify (RFID) reader and/or writer device.

The switches 428 may couple to the DSP 402 via the input/output interface 418 to provide one mechanism for the user to provide input to the UE 400. Alternatively, one or more of the switches 428 may be coupled to a motherboard of the UE 400 and/or to components of the UE 400 via a different path (e.g., not via the input/output interface 418), for example coupled to a power control circuit (power button) of the UE 400. The touchscreen display 430 is another input mechanism, which further displays text and/or graphics to the user. The touch screen LCD controller 432 couples the DSP 402 to the touch screen display 430. The GPS receiver 438 is coupled to the DSP 402 to decode global positioning system signals, thereby enabling the UE 400 to determine its position. In an embodiment, the UE 400 is the UE 102 of FIG. 1 that may include a smart phone, a wearable computer, a personal digital assistant (PDA), a headset computer, a laptop computer, a notebook computer, and a tablet computer.

Figure 5:
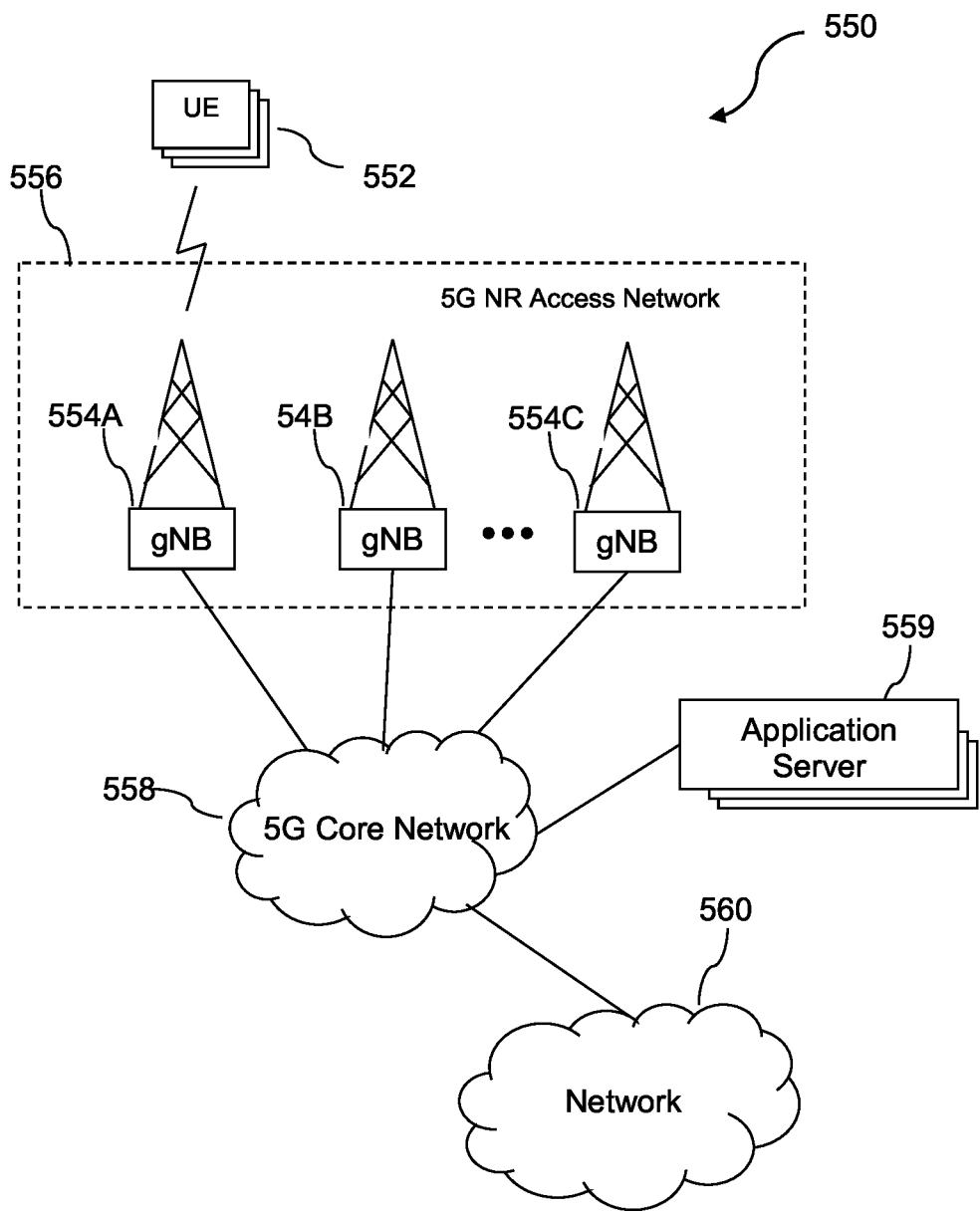
FIG. 5 is a block diagram of a communication system according to an embodiment of the disclosure.

Turning now to FIG. 5, an exemplary communication system 550 is described. Parts of the 5G communication network 118 described above with reference to FIG. 1 may be implemented substantially like the communication system 550 described in FIG. 5 and FIG. 6. Typically, the communication system 550 includes a number of access nodes 554A-554C that are configured to provide coverage in which UEs 552 such as cell phones, tablet computers, machine-type-communication devices, tracking devices, embedded wireless modules, and/or other wirelessly equipped communication devices (whether or not user operated), can operate. The UE 552 may be the UE 102 that operates with the 5G communication network 118 (FIG. 1). The access nodes 554A-554C may be said to establish an access network 556. The access network 556 may be referred to as a radio access network (RAN) in some contexts. In a 5G technology generation, an access node 554A-554C may be referred to as a gigabit Node B (gNB). In 4G technology (e.g., long term evolution (LTE) technology) an access node 554A-554C may be referred to as an enhanced Node B (eNB). In 3G technology (e.g., code division multiple access (CDMA) and global system for mobile communication (GSM)) an access node 554A-554C may be referred to as a base transceiver station (BTS) combined with a basic station controller (BSC). In some contexts, the access node 554A-554C may be referred to as a cell site or a cell tower. In some implementations, a picocell may provide some of the functionality of an access node 554A-554C, albeit with a constrained coverage area. Each of these different embodiments of an access node 554A-554C may be considered to provide roughly similar functions in the different technology generations.

In an embodiment, the access network 556 comprises a first access node 554A, a second access node 554B, and a third access node 554C. It is understood that the access network 556 may include any number of access nodes 554A-554C. Further, each access node 554A-554C could be coupled with a 5G core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554A-554C and could thereby communicate via the access node 554A-554C with various application servers and other entities. In another embodiment, the sub-systems may communicate via the access nodes 554A-554C.

The communication system 550 could operate in accordance with a particular RAT, with communications from an access node 554A-554C to UEs 552 defining a downlink or forward link and communications from the UEs 552 to the access node 554A-554C defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as LTE, which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554A-554C could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in an RF spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554A-554C and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554A-554C to served UEs 552. And on the uplink, certain resource elements could be reserved to carry random access signaling from UEs 552 to the access node 554A-554C, and other resource elements could be reserved to carry other control signaling such as PRB-scheduling requests and acknowledgement signaling from UEs 552 to the access node 554A-554C.

The access node 554A-554C, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center. The CU may be hosted in user equipment.

Figure 6:
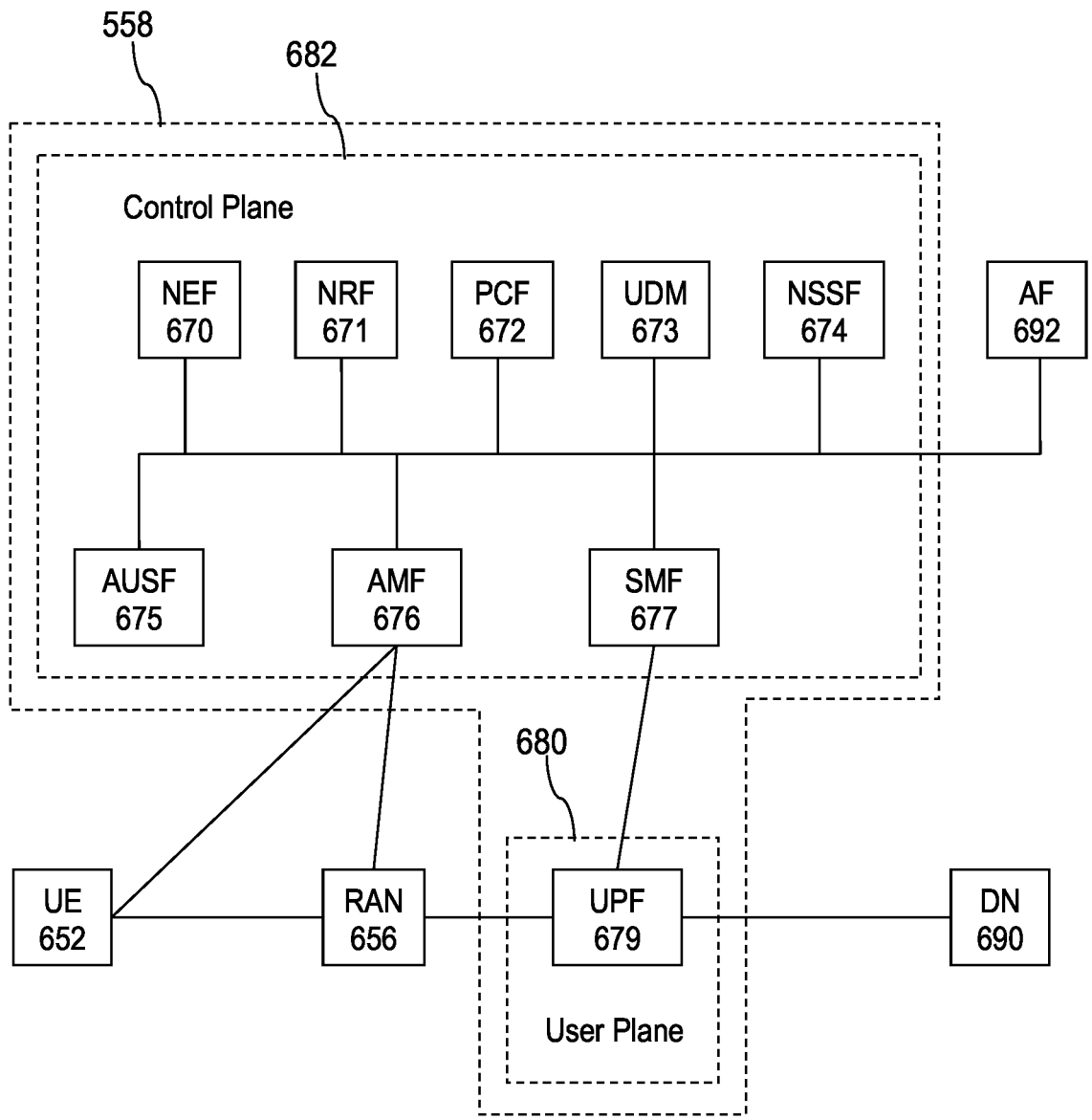
FIG. 6 is a block diagram of a core network of a communication system according to an embodiment of the disclosure.

Turning now to FIG. 6, further details of the core network 558 are described. In an embodiment, the core network 558 is a 5G core network. In an embodiment, the core network 558 may be constructed on the UE 102 (FIG. 1). 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed in a private domain environment which supports dynamic scaling and avoidance of long-term capital expenditures (fees for use may substitute for capital expenditures). In an embodiment, these services or network functions may be executed on user equipment such as, for example, executed on the UE 102 of FIG. 1. These network functions can include, for example, a user plane function (UPF) 679, an authentication server function (AUSF) 675, an access and mobility management function (AMF) 676, a session management function (SMF) 677, a network exposure function (NEF) 670, a network repository function (NRF) 671, a policy control function (PCF) 672, a unified data management (UDM) 673, a network slice selection function (NSSF) 674, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 680 and a control plane 682, thereby promoting independent scalability, evolution, and flexible deployment.

The UPF 679 delivers packet processing and links the UE 552, via the access node 554, to a data network 690 (e.g., the network 560 illustrated in FIG. 5 or the communication network 118 in FIG. 1). As discussed above, the UE 552 may be the UE 102 that operates with the 5G communication network 118 (FIG. 1). The AMF 676 handles registration and connection management of non-access stratum (NAS) signaling with the UE 552. Said in other words, the AMF 676 manages UE registration and mobility issues. The AMF 676 manages reachability of the UEs 552 as well as various security issues. The SMF 677 handles session management issues. Specifically, the SMF 677 creates, updates, and removes (destroys) protocol data unit (PDU) sessions and manages the session context within the UPF 679. The SMF 677 decouples other control plane functions from user plane functions by performing dynamic host configuration protocol (DHCP) functions and IP address management functions. The AUSF 675 facilitates security processes.

The NEF 670 securely exposes the services and capabilities provided by network functions. The NRF 671 supports service registration by network functions and discovery of network functions by other network functions. The PCF 672 supports policy control decisions and flow-based charging control. The UDM 673 manages network user data and can be paired with a user data repository (UDR) that stores user data such as customer profile information, customer authentication number, and encryption keys for the information. An application function 692, which may be located outside of the core network 558, exposes the application layer for interacting with the core network 558. In an embodiment, the application function 692 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 674 can help the AMF 676 to select the network slice instance (NSI) for use with the UE 552.

Figure 7:
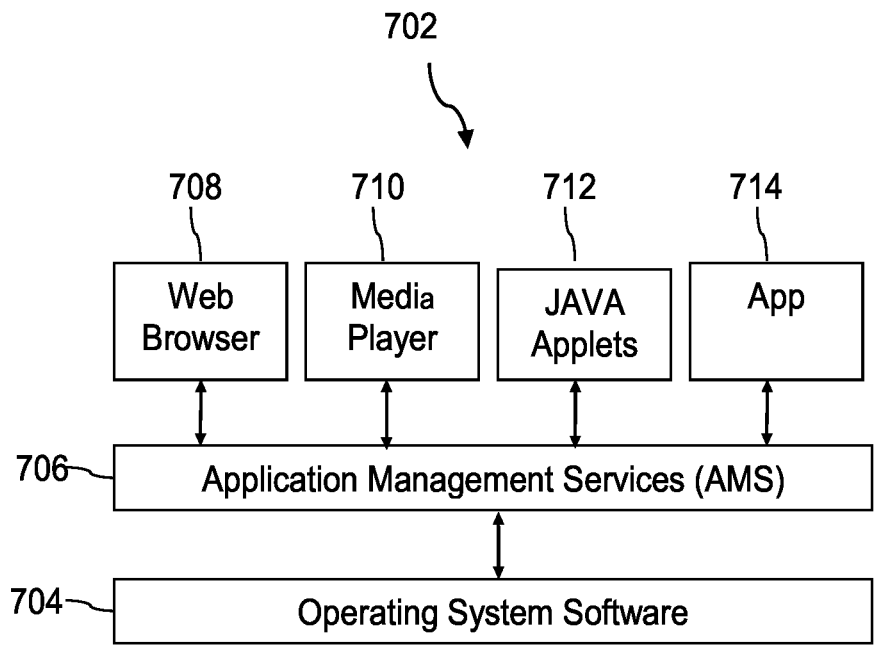
FIG. 7 is a block diagram of software architecture of a communication device according to an embodiment of the disclosure.

FIG. 7 illustrates a software environment 702 that may be implemented by the DSP 402. The DSP 402 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 706 that transfer control between applications running on the UE 400. Also shown in FIG. 7 are a web browser application 708, a media player application 710, and JAVA applets 712. The web browser application 708 may be executed by the UE 400 to browse content and/or the Internet, for example when the UE 400 is coupled to a network via a wireless link. The web browser application 708 may permit a user to enter information into forms and select links to retrieve and view web pages. The media player application 710 may be executed by the UE 400 to play audio or audiovisual media. The JAVA applets 712 may be executed by the UE 400 to provide a variety of functionality including games, utilities, and other functionality.

Figure 8:
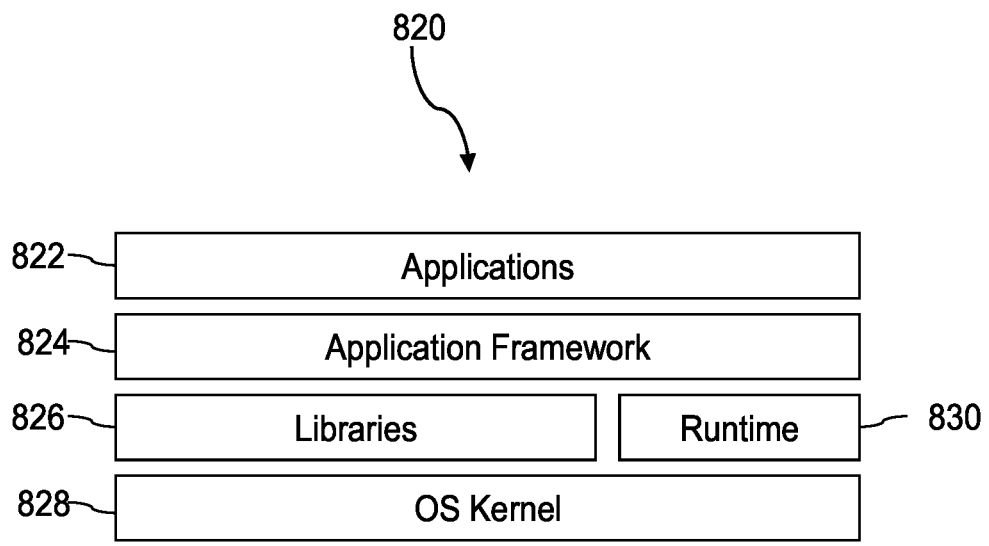
FIG. 8 is a block diagram of another software architecture of a communication device according to an embodiment of the disclosure.

FIG. 8 illustrates an alternative software environment 820 that may be implemented by the DSP 402. The DSP 402 executes operating system kernel (OS kernel) 828 and an execution runtime 830. The DSP 402 executes applications 822 that may execute in the execution runtime 830 and may rely upon services provided by the application framework 824. Applications 822 and the application framework 824 may rely upon functionality provided via the libraries 826.

Figure 9:
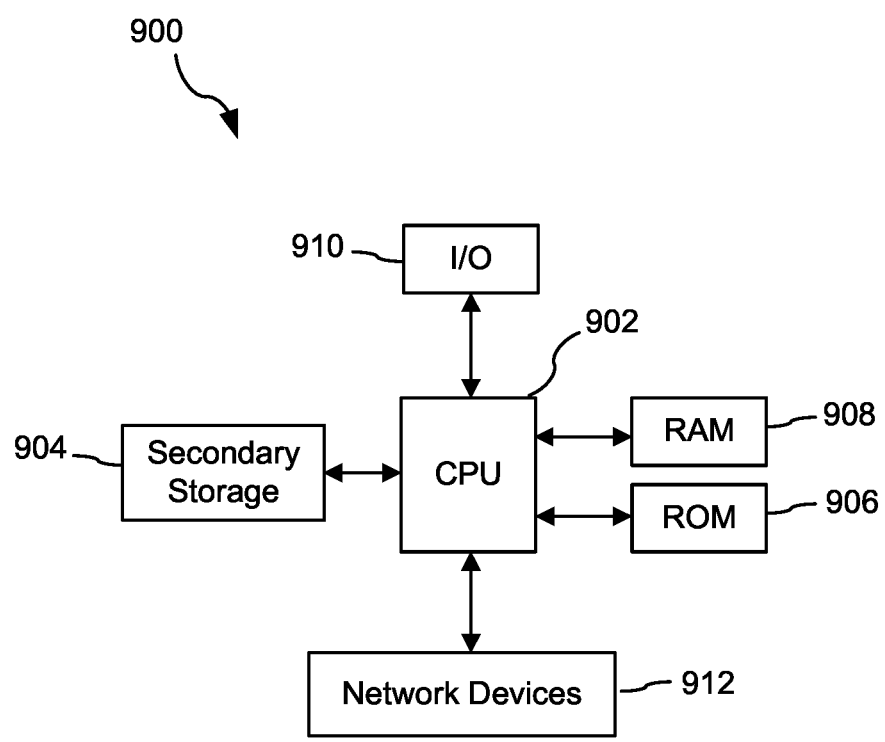
FIG. 9 is a block diagram of a computer system according to an embodiment of the disclosure.

FIG. 9 illustrates a computer system 900 suitable for implementing one or more embodiments disclosed herein. The computer system 900 includes a processor 902 (which may be referred to as a central processor unit (CPU)) that is in communication with memory devices including secondary storage 904, read-only memory (ROM) 906, random-access memory (RAM) 908, input/output (I/O) devices 910, and network connectivity devices 912. The computer system 900 may be UE 102, FFD proxy server 124, or content management server 126. The processor 902 may be implemented as one or more CPU chips.

It is understood that by programming and/or loading executable instructions onto the computer system 900, at least one of the CPU 902, the RAM 908, and the ROM 906 are changed, transforming the computer system 900 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application-specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 900 is turned on or booted, the CPU 902 may execute a computer program or application. For example, the CPU 902 may execute software or firmware stored in the ROM 906 or stored in the RAM 908. In some cases, on boot and/or when the application is initiated, the CPU 902 may copy the application or portions of the application from the secondary storage 904 to the RAM 908 or to memory space within the CPU 902 itself, and the CPU 902 may then execute instructions that the application is comprised of. In some cases, the CPU 902 may copy the application or portions of the application from memory accessed via the network connectivity devices 912 or via the I/O devices 910 to the RAM 908 or to memory space within the CPU 902, and the CPU 902 may then execute instructions that the application is comprised of. During execution, an application may load instructions into the CPU 902, for example load some of the instructions of the application into a cache of the CPU 902. In some contexts, an application that is executed may be said to configure the CPU 902 to do something, e.g., to configure the CPU 902 to perform the function or functions promoted by the subject application. When the CPU 902 is configured in this way by the application, the CPU 902 becomes a specific purpose computer or a specific purpose machine.

The secondary storage 904 is typically comprised of one or more disk drives or tape drives and is used for non-volatile storage of data and as an over-flow data storage device if RAM 908 is not large enough to hold all working data. Secondary storage 904 may be used to store programs which are loaded into RAM 908 when such programs are selected for execution. The ROM 906 is used to store instructions and perhaps data which are read during program execution. ROM 906 is a non-volatile memory device which typically has a small memory capacity relative to the larger memory capacity of secondary storage 904. The RAM 908 is used to store volatile data and perhaps to store instructions. Access to both ROM 906 and RAM 908 is typically faster than to secondary storage 904. The secondary storage 904, the RAM 908, and/or the ROM 906 may be referred to in some contexts as computer readable storage media and/or non-transitory computer readable media.

I/O devices 910 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 912 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 912 may provide wired communication links and/or wireless communication links (e.g., a first network connectivity device 912 may provide a wired communication link and a second network connectivity device 912 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WIFI (IEEE 802.11), Bluetooth, ZIGBEE, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 912 may enable the processor 902 to communicate with the Internet or one or more intranets. With such a network connection, it is contemplated that the processor 902 might receive information from the network, or might output information to the network in the course of performing the above-described method steps. Such information, which is often represented as a sequence of instructions to be executed using processor 902, may be received from and outputted to the network, for example, in the form of a computer data signal embodied in a carrier wave.

Such information, which may include data or instructions to be executed using processor 902 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 902 executes instructions, codes, computer programs, scripts which it accesses from hard disk, floppy disk, optical disk (these various disk based systems may all be considered secondary storage 904), flash drive, ROM 906, RAM 908, or the network connectivity devices 912. While only one processor 902 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 904, for example, hard drives, floppy disks, optical disks, and/or other device, the ROM 906, and/or the RAM 908 may be referred to in some contexts as non-transitory instructions and/or non-transitory information.

In an embodiment, the computer system 900 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 900 to provide the functionality of a number of servers that is not directly bound to the number of computers in the computer system 900. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer-usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 900, at least portions of the contents of the computer program product to the secondary storage 904, to the ROM 906, to the RAM 908, and/or to other non-volatile memory and volatile memory of the computer system 900. The processor 902 may process the executable instructions and/or data structures in part by directly accessing the computer program product, for example by reading from a CD-ROM disk inserted into a disk drive peripheral of the computer system 900. Alternatively, the processor 902 may process the executable instructions and/or data structures by remotely accessing the computer program product, for example by downloading the executable instructions and/or data structures from a remote server through the network connectivity devices 912. The computer program product may comprise instructions that promote the loading and/or copying of data, data structures, files, and/or executable instructions to the secondary storage 904, to the ROM 906, to the RAM 908, and/or to other non-volatile memory and volatile memory of the computer system 900.

In some contexts, the secondary storage 904, the ROM 906, and the RAM 908 may be referred to as a non-transitory computer readable medium or a computer readable storage media. A dynamic RAM embodiment of the RAM 908, likewise, may be referred to as a non-transitory computer readable medium in that while the dynamic RAM receives electrical power and is operated in accordance with its design, for example during a period of time during which the computer system 900 is turned on and operational, the dynamic RAM stores information that is written to it. Similarly, the processor 902 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for installing a web application by a proxy server using content according to a friction free download (FFD) installation, and comprising:
    a user communication device configured to:
        send, via an FFD client application, identification information of the user communication device;
        send, via the FFD client application, subscriber information of a user at a mobile network operator (MNO);
        receive, via a first web application, web content in an application session of the first web application;
        send, via the first web application, an FFD installation request for implementing an FFD installation of a second web application on the user communication device in the application session;
        download, using second proxy routing information, an application package container of the second web application; and
        install, via the FFD client application, the second web application during the application session of the first web application; and
    an FFD proxy server configured to:
        receive, from the FFD client application, the identification information of the user communication device;
        receive, from a content management server, web service registration information of the content management server, wherein the web service registration information comprises first proxy routing information, and wherein the first proxy routing information comprises information for routing the FFD installation request to the FFD proxy server;
        register the content management server at the FFD proxy server using the web service registration information;
        receive, from the first web application, the FFD installation request for implementing the FFD installation of the second web application on the user communication device;
        authenticate the user communication device in response to receiving the FFD installation request during the application session of the first web application;
        send, to the FFD client application and during the application session of the first web application, the second proxy routing information for the second web application in response to authenticating the user communication device; and
        send, to the first web application during the application session of the first web application, notification information indicating a status of the FFD installation of the second web application.

2. The system of claim 1, wherein the FFD proxy server is further configured to:
    register, using the web service registration information, the content management server for the FFD installation; and
    route, using the first proxy routing information, the FFD installation request to the FFD proxy server.

3. The system of claim 1, wherein the web content comprises routing information, and wherein the first web application is configured to send the FFD installation request to the FFD proxy server based on the routing information.

4. The system of claim 1, wherein the identification information comprises at least one of an alphanumeric identifier of the user communication device or identity information of the user of the user communication device.

5. The system of claim 1, wherein the FFD proxy server is configured to:
    receive, from the FFD client application, second identification information of the user communication device in the FFD installation request;
    compare the identification information with the second identification information to obtain a comparison result; and
    determine whether the user communication device is authenticated based on the comparison result.

6. The system of claim 1, wherein the FFD client application is configured to register the user communication device using the identification information of the user communication device.

7. The system of claim 6, wherein the FFD client application is configured to:
    send the subscriber information of the user at the MNO; and
    further register the user communication device using the subscriber information of the user at the MNO.

8. The system of claim 1, wherein the first proxy routing information comprises information for routing the FFD installation request to the FFD proxy server.

9. A method for installing a web application by a FFD proxy server using web content according to a friction free download (FFD) installation, wherein the method comprises:
receiving, by an FFD proxy server via an FFD client application of a user communication device, identification information of the user communication device;
receiving, by the FFD proxy server from a content management server, web service registration information, wherein the web service registration information comprises first proxy routing information;
receiving, by the FFD proxy server in an application session of a first web application of the user communication device, an FFD installation request for implementing the FFD installation of a second web application on the user communication device, wherein the FFD installation request is based on web content in the first web application, and wherein the web content comprises the first proxy routing information that redirects the FFD installation request to the FFD proxy server;
authenticating, by the FFD proxy server, the user communication device in response to receiving the FFD installation request and during the application session of the first web application;
sending, by the FFD proxy server to the FFD client application and during the application session of the first web application, second proxy routing information for the second web application instructing the FFD client application to download an application package container and install the second web application to the user communication device during the application session of the first web application in response to authenticating the user communication device; and
sending, by the FFD proxy server to the first web application and during the application session of the first web application, notification information indicating a status of the FFD installation of the second web application on the user communication device after installation of the second web application during the application session of the first web application.

10. The method of claim 9, further comprising:
registering, by the FFD proxy server using the web service registration information, the content management server for the FFD installation; and
routing, by the FFD proxy server using the first proxy routing information, the FFD installation request to the FFD proxy server.

11. The method of claim 9, wherein the web content comprises routing information, and wherein the method further comprises receiving, from the first web application, the FFD installation request at the FFD proxy server based on the routing information.

12. The method of claim 9, wherein the identification information comprises at least one of an alphanumeric identifier of the user communication device or identity information of a user of the user communication device.

13. The method of claim 9, further comprising:
receiving, by FFD proxy server from the FFD client application, the identification information of the user communication device;

receiving, by FFD proxy server from the FFD client application, second identification information of the user communication device in the FFD installation request;
comparing, by FFD proxy server, the identification information with the second identification information to obtain a comparison result; and
determining, by FFD proxy server, that the user communication device is authenticated based on the comparison result.

14. The method of claim 9, further comprising:
receiving, from the FFD client application, the identification information of the user communication device; and
registering, by the FFD proxy server, the user communication device using the identification information of the user communication device.

15. The method of claim 14, further comprising:
receiving, from the FFD client application, subscriber information of the user at a mobile network operator (MNO); and
further registering, by the FFD proxy server, the user communication device using the subscriber information of the user at the MNO.

16. The method of claim 9, wherein the first proxy routing information comprises information for routing the FFD installation request to the FFD proxy server.

17. A system for installing a web application by a proxy server using a content according to a friction free download (FFD) installation, and comprising:
a user communication device configured to:
send, via an FFD client application, identification information of the user communication device, wherein the identification information comprises at least one of an alphanumeric identifier of the user communication device or identity information of a user of the user communication device;
receive, via a first web application, web content in an application session of the first web application;
send, via the first web application, an FFD installation request for implementing an FFD installation of a second web application on the user communication device in the application session;
download, using second proxy routing information, an application package container of the second web application; and
install, via the FFD client application, the second web application during the application session of the first web application; and
an FFD proxy server configured to:
receive, from a content management server, web service registration information of the content management server during the application session of the first web application, wherein the web service registration information comprises first proxy routing information, and wherein the first proxy routing information comprises information for routing the FFD installation request to the FFD proxy server;
register, using the web service registration information, the content management server for the FFD installation;
receive, from the first web application, the FFD installation request for implementing the FFD installation of the second web application on the user communication device;
route, using the first proxy routing information, the FFD installation request to the FFD proxy server;

authenticate the user communication device in response to receiving the FFD installation request during the application session of the first web application, wherein authenticating the user communication device comprises:
   receiving, from the FFD client application, second identification information of the user communication device in the FFD installation request;
   comparing the identification information with the second identification information to obtain a comparison result; and
   determining whether the user communication device is authenticated based on the comparison result;
send, to the FFD client application and during the application session of the first web application, the second proxy routing information for the second web application in response to authenticating the user communication device; and
send, to the first web application during the application session of the first web application, notification information indicating a status of the FFD installation of the second web application.

18. The system of claim 17, wherein the web content comprises routing information, and wherein the first web application is configured to send the FFD installation request to the FFD proxy server based on the routing information.

* * * * *